Figure 1:
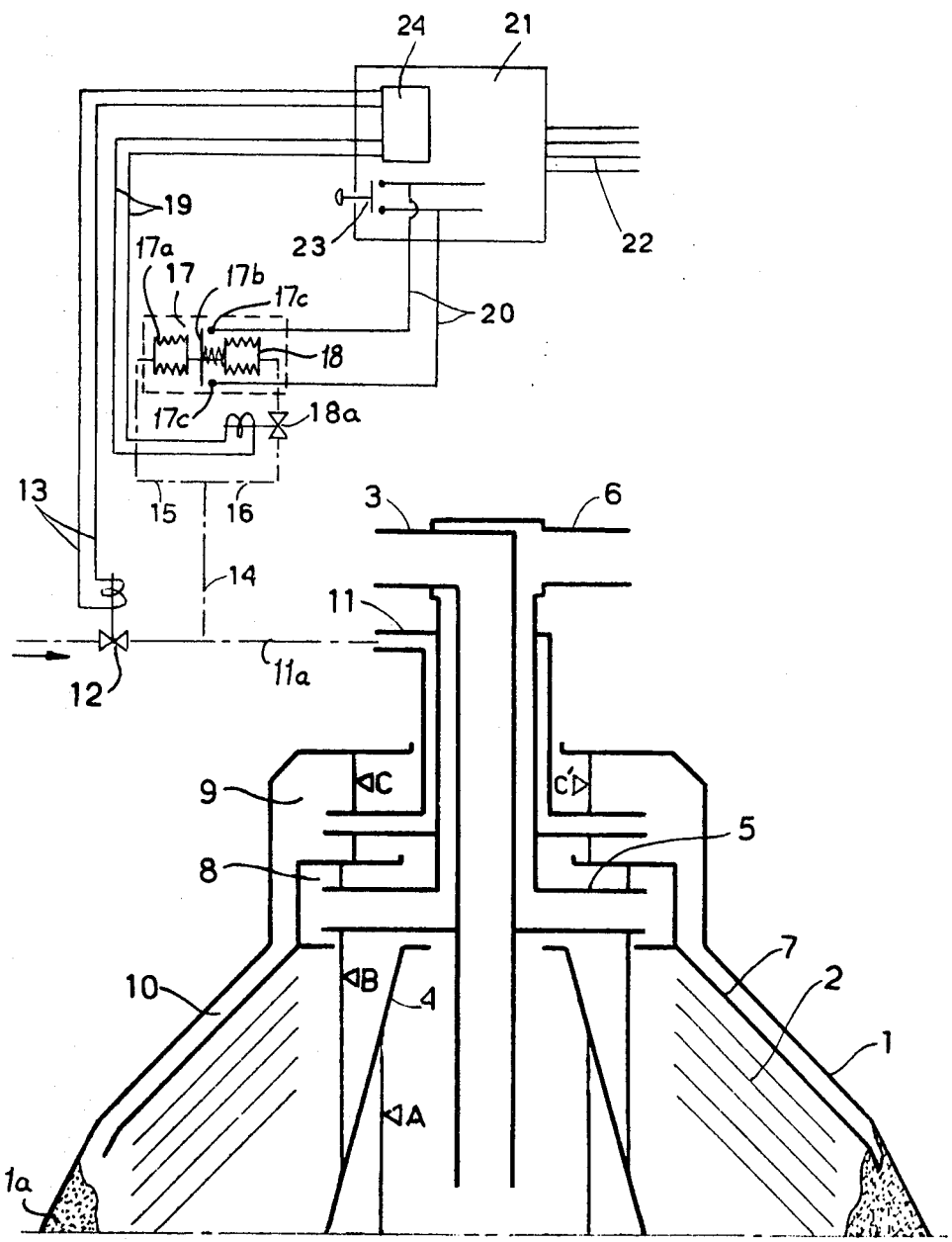

United States Patent

[11] 3,580,493

| [72] | Inventor | Lars-Erik Jonsson<br>Tumba, Sweden |
|---|---|---|
| [21] | Appl. No. | 770,977 |
| [22] | Filed | Oct. 28, 1968 |
| [45] | Patented | May 25, 1971 |
| [73] | Assignee | Alfa-Laval AB<br>Tumba, Sweden |
| [32] | Priority | Oct. 31, 1967 |
| [33] | | Sweden |
| [31] | | 14,886/1967 |

[54] METHOD AND APPARATUS FOR DETECTING SLUDGE LEVEL IN A CENTRIFUGE
15 Claims, 2 Drawing Figs.

[52] U.S. Cl. .................................................. 233/19
[51] Int. Cl. ....................................... B04b 11/02
[50] Field of Search ................................ 233/19, 20

[56] References Cited
UNITED STATES PATENTS

| 3,396,910 | 8/1963 | Steinacker | 233/20 |
| 3,408,000 | 10/1968 | Nilson | 233/19 |
| 3,410,479 | 11/1968 | Nilson | 233/20 |
| 3,445,061 | 5/1969 | Nilson | 233/20 |

Primary Examiner—William I. Price
Attorney—Davis, Hoxie, Faithfull & Hapgood

ABSTRACT: A centrifugal rotor has a separating chamber with a sludge-collecting space and also has an indicating channel adapted for passage of an indicating liquid through its radially outer end which is positioned to be blocked by sludge collected to a predetermined level in the collecting space. To detect when the blocking occurs, the apparatus registers a reference pressure condition sensed at a certain point of the indicating channel in a first time period, and this reference pressure condition is compared with an indicating pressure condition sensed at the same point in a second time period commencing after the beginning of the first time period, these registering and comparing operations being repeated until the difference between the compared pressure conditions acquires a predetermined value indicative of said blocking. The compared pressure conditions may be pressures prevailing at said point at instants constituting said first and second time periods, respectively, or they may be pressure changes sensed at said point during time intervals constituting said first and second time periods, respectively.

METHOD AND APPARATUS FOR DETECTING SLUDGE LEVEL IN A CENTRIFUGE

THE DISCLOSURE

This invention relates to centrifugal rotors of the type having a separating chamber with a space for collecting separated sludge and also having an indicating channel with a radially outer end adapted for passage of an indicating liquid therethrough, such outer end being positioned to be blocked by sludge collected to a predetermined level in said space. More particularly, the invention relates to an improved method and apparatus for detecting the occurrence of this blocking, whereby the sludge can be discharged when it is collected to the predetermined level.

It is known in the art to discharge sludge from the rotor in response to an indication occurring when an indicating liquid becomes incapable of passing freely between the rotor's separating chamber and the indicating channel. However, the prior arrangements for this purpose have the serious disadvantage of requiring attention to and control over the flow, to and from the rotor, of the liquid to be separated, so as to prevent premature or tardy sludge discharges due to failure to maintain a constant operating pressure within the indicating channel. Regardless of whether this previously required supervision and control were effected automatically or manually, they entailed an expensive and undesirable complication.

The principal object of the present invention, therefore, is to provide a method and apparatus less expensive than those previously used for preventing untimely sludge discharges from the rotor, and by which the requirement for supervision and control of the liquid flow to and from the rotor is reduced to a minimum.

An apparatus made according to the invention comprises means for sensing the liquid pressure at a predetermined point in the indicating channel during operation of the rotor, storing means for registering a reference pressure condition sensed at said point in a first time period, and comparing means for measuring the difference between a reference pressure condition thus registered and an indicating pressure condition sensed at said point in a second time period commencing after the beginning of the first period. When this measured difference acquires a certain value signifying blockage of the indicating channel, the collected sludge is discharged from the rotor, preferably by a conventional arrangement operating automatically in response to a signal.

The reference and indicating pressure conditions thus compared, according to the invention, may be the pressures sensed at instants constituting the first and second time periods, respectively; or the compared pressure conditions may be pressure changes sensed during time intervals constituting the respective time periods.

With the apparatus of the present invention, and the new method which it performs, variations in the liquid flow to and from the rotor can be tolerated because the pressure or pressure change within the indicating channel, chosen as a reference value for sludge discharge, is a pressure or pressure change which continuously varies depending upon the pressure variations occurring within the separating chamber of the rotor. This is in contrast to the prior practice wherein the reference value is a fixed pressure determined in advance.

Various means may be used for sensing the liquid pressure at a predetermined point in the indicating channel, and of course the other components of the apparatus must be adapted to the particular form of means chosen for this purpose.

In many cases, it is suitable to sense the liquid pressure at the aforesaid point by sensing the position of a liquid surface formed within the indicating channel during operation of the rotor. The position of such a liquid surface may, of course, be sensed in many different ways, as by means of more or less complicated electrical equipment. In a preferred embodiment of the invention, the pressure sensing means comprises a conduit which extends from the outside of the rotor into the indicating channel and opens at a point radially outside the level at which the liquid surface within the channel is situated during normal operation of the rotor, the conduit being arranged so that a certain pressure prevailing therein corresponds to a certain position of the liquid surface formed within the indicating channel.

The apparatus of the invention is especially suitable for use in connection with intermittently performed indicating operations, and it is therefore preferably adapted to compare the pressure or pressure change sensed within the indicating channel immediately before an indicating operation with the pressure or pressure change sensed during the indicating operation.

Figure 2:
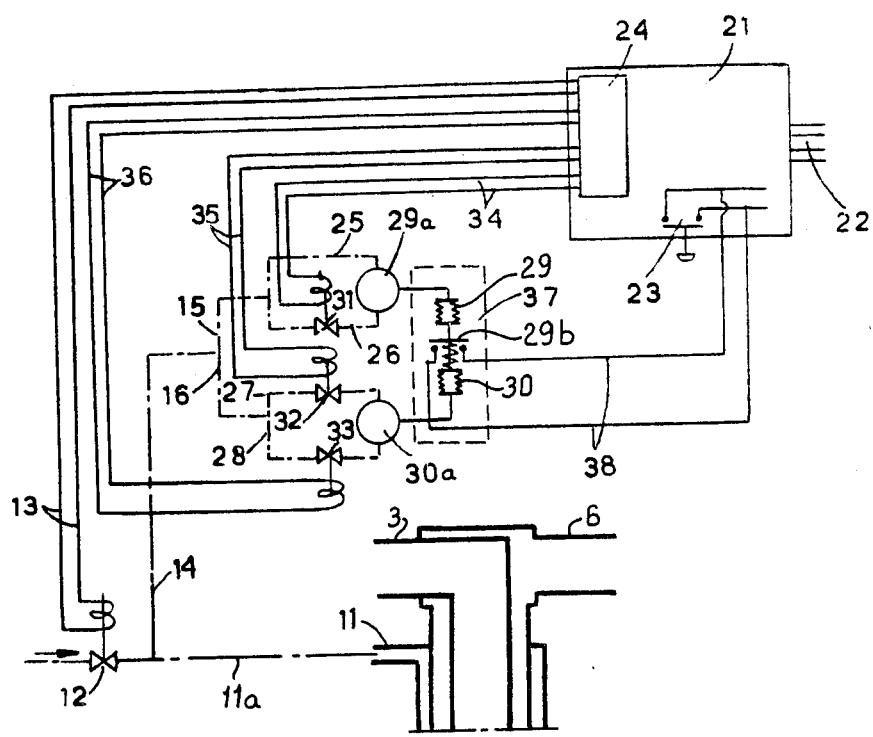

Two embodiments of the apparatus according to the invention, chosen as examples only, will be described in detail below with reference to the accompanying drawings, in which FIG. 1 shows schematically a vertical section through part of a centrifugal separator of a known kind together with one embodiment of the new apparatus: and FIG. 2 shows, also schematically, the upper part of the centrifugal separator shown in FIG. 1 together with another embodiment of the new apparatus.

The centrifugal separator shown in FIG. 1 comprises a rotor 1, a set of discs 2 arranged in the separating chamber of the rotor, a pipe 3 for leading liquid to be separated into the rotor, a distributor 4 through which the liquid passes to the separating chamber, and a paring disc 5 for paring out separated liquid. The paring disc 5 is connected to an outlet pipe 6 for the separated liquid. The rotor 1 is adapted to be rotated about its central vertical axis.

The uppermost disc 7, as shown in FIG. 1, is a little thicker than the other discs 2 and forms at its radially inner part a chamber 8 wherein the stationary paring disc 5 is placed, and the disc 7 also forms with the rotor 1 a chamber 9 situated above chamber 8. Between the rotor 1 and the upper plate 7 is a channel 10 which connects the chamber 9 with the separating chamber of the rotor. The channel 10 extends so that its radially outer end will be blocked by sludge when a predetermined amount of sludge has been separated and accumulated in the peripheral sludge-collecting space 1a of the separating chamber, such blocking being shown at the right-hand part of FIG. 1. Before such a blocking occurs (see the left-hand part of FIG. 1), every pressure change within the separating chamber of the rotor can be sensed within the chamber 9.

As long as the connection 10 between the chamber 9 and the separating chamber of the rotor 1 is open, the liquid levels designated A, B and C in the drawing will be present within the rotor. (The difference between the levels B and C depends substantially on the flow resistance to which the liquid passing through the set of discs 2 is subjected by the latter.)

A stationary conduit 11 opens into chamber 9, as shown in FIG. 1, and the extension of this conduit outside the rotor is shown schematically as a broken line 11a. The conduit 11—11a serves to supply an indicating liquid to the chamber 9 and has a shutoff valve 12 inserted in the conduit. This valve is operable electrically via electrical lines 13 in such a way that indicating liquid is supplied to the chamber 9 intermittently.

The conduit 11—11a communicates constantly with another conduit 14 connected between the rotor 1 and the valve 12. This latter conduit 14 is divided into two branch conduits 15 and 16 which are connected, respectively, to the two sides of a so-called differential pressure switch 17. In the branch conduit 16 is a shutoff valve 18a which is operable electrically via electrical lines 19. Normally, the valve 18a is open, so that the differential pressure switch 17 is subjected to the same pressure on both sides. As shown, these two sides comprise opposed pressure-responsive elements in the form of bellows 17a and 18, respectively, which are fixed at their outer ends, the interconnection between their inner ends including the switch member 17b which is normally disengaged from its contacts 17c.

At predetermined time intervals, the valve 18a is closed so that a pressure prevailing within the conduit 11 at a certain instant of time is maintained or "stored" within the branch conduit 16 between the valve 18a and the corresponding side 18 of differential pressure switch 17. The pressure thus stored or registered represents the position (level) of the liquid surface C in the chamber 9. Roughly simultaneously, the valve 12 is opened and indicating liquid is forced into the chamber 9 through the conduit 11. If at this moment sludge has been separated within the rotor to an extent such that the radially outer end of channel 10 is blocked, the supply of indicating liquid will cause the liquid surface in the chamber 9 to move radially inward to a new position which in FIG. 1 is designated C'. This results in a pressure increase in the conduit 11–11a and therefore in the other conduit 14 and its branch conduit 15 as well. The new pressure thus representing the position of the liquid surface C' in the chamber 9 is now acting upon the side 17a of differential pressure switch 17, which compares this new pressure with the pressure previously registered at the opposing side 18 and representing the position of the liquid surface C. If the difference is sufficient, the switch member 17b closes its contacts 17c and, via electrical lines 20 and an operating unit 21, initiates a sludge discharge operation. The signals leaving the operating unit 21 are illustrated in the drawing by four lines 22. After each indicating operation, the valve 12 is closed and the valve 18a is opened.

The sludge discharge operation may, if desired, also be initiated manually by a pushbutton switch 23 on the operating unit 21.

Reference number 24 designates a conventional device arranged to effect all the required valve movements in accordance with a time schedule as described above, so as to carry out the sludge indicating operations and repeat them at predetermined time intervals.

In the embodiment shown in FIG. 2, a sludge discharge operation may be initiated under control of a measured difference between two pressure changes in the channel 10, sensed at different times. This embodiment, too, comprises conduits 11–11a and 14 and branch conduits 15 and 16 of the latter, as well as the operating unit 21 and the electrical lines 13 leading from the control device 24 of this unit to the shutoff valve 12 in the conduit 11–11a. The branch conduits 15 and 16 in the FIG. 2 embodiment are further divided into conduits 25, 26, 27 and 28, which are connected in pairs to the two sides of respective differential pressure converters 29a and 30a. Such converters are conventional instruments for providing an output pressure representing the difference between two input pressures. Three shutoff valves 31, 32 and 33 are arranged in the connection conduits 26, 27 and 28, respectively, and are operable by means of said device 24 via electrical lines 34, 35 and 36, respectively. The difference pressure converters 29a and 30a are connected to a difference pressure switch 37, one on each side of the latter, the difference pressure switch being connected with the operating unit 21 through lines 38.

In the operation of the arrangement shown in FIG. 2, the following operations are repeated at predetermined time intervals, it being understood that at the beginning the valve 12 is closed and the valves 31, 32 and 33 are open: (a) the valve 33 is closed, (b) after a predetermined first period of time the valve 32 is closed, the pressure change within the conduit 11–11a having occurred during this first period of time and having been registered by the differential pressure converter 30a as a pressure difference which is transferred as a pneumatic signal to one side 30 of the differential pressure switch 37, (c) the valve 31 is closed, the preserved pressure in the connecting conduit 26 between the valve 31 and the differential pressure converter 29a representing the position of the liquid surface C in the chamber 9, (d) the valve 12 is opened and indicating liquid is pumped into the chamber 9 through the conduit 11–11a, (e) after a predetermined second period of time the valves 31, 32 and 33 are opened again, the valve 12 then being closed.

If the channel 10 in the rotor is blocked by sludge, when indicating liquid is supplied to the chamber 9, the pressure in the conduit 11–11a will increase so rapidly during the second period of time mentioned under point (e) that the pneumatic signal from the differential pressure converter 29a exceeds the pneumatic signal registered at the differential pressure switch 37 and coming from the other differential pressure converter 30a, with more than a predetermined value, so that the differential pressure switch 37, via electrical lines 38 and the operating unit 21, will initiate a sludge discharge operation. As easily can be understood, the two said periods of time do not necessarily have to be equal in length. The differential switch member itself is shown at 29b in FIG. 2.

If it would prove desirable to register (store) during the sludge indicating operation not only the first but also the second of the pressure informations from the indicating channel 10, which are intended to be compared, this of course may be easily performed. With the arrangement shown in FIG. 2, for example, a valve could be arranged in each of the connecting conduits between the differential pressure converters 29a and 30a and the differential pressure switch 37. These valves then normally should be closed and be adapted to be opened simultaneously, immediately before the valves 31, 32 and 33 are opened according to point (e) above.

In the two embodiments shown in the drawings, a certain amount of air will be enclosed within the system of ducts 11, 14, 15, and 11, 14, 15, 16, 25, 26, 27 and 28, respectively, at the filling of the centrifugal rotor, when it is started. In order to avoid penetration of liquid into the measuring instrument, indicating liquid may be supplied to the chamber 9 through a separate conduit. If for instance the hygienic requirements are very strict, air, for instance, may be supplied through the conduit 11, which air then serves as a pressure sensing medium. In connection with hermetically closed centrifugal rotors, a pressure sensing medium of this kind may be a gas soluble in the liquid separated within the rotor, or another liquid than the separated liquid.

It will be understood that the indicating channel 10 has a radially outer end opening into sludge space 1a and forms a liquid level C in normal operation of the rotor, this level moving radially inward to level C' when channel 10 is obstructed at its outer end by sludge accumulated in space 1a. The conduits 11–11a and 14 comprise means for sensing the liquid pressure at a certain point in channel 10, in that the pressure in those conduits will vary with variations in the pressure at the opening of conduit 11 into chamber 9. The side 18 (30 in FIG. 2) of differential pressure switch 17 (37 in FIG. 2) may be considered as comprising a storing means operatively connected to the aforesaid sensing means for registering a reference pressure condition sensed by the sensing means in a first time period; and the part 17a (29 in FIG. 2) may be considered as comprising a comparing means for measuring the difference between the said reference pressure condition and an indicating pressure condition sensed by the aforesaid sensing means in a second period of time commencing after the beginning of said first time period.

It will also be understood that in accordance with the invention a reference pressure condition (a certain pressure or pressure difference) sensed in a part of the indicating channel is registered or stored and is then compared with a similar pressure condition in the same part but sensed at a different time period (instant or interval), the difference being a measure used to determine when the sludge has accumulated to a level sufficient to block the indicating channel.

Only two embodiments of the arrangement according to the invention have been described above. Both of these embodiments are based on a special way of sensing the liquid pressure in the said indicating channel within the rotor. If this liquid pressure is sensed according to other methods, it is quite clear that the means for registering and comparing the values of the pressures or pressure changes sensed at different occasions have to be constructed quite differently than the corresponding means described above. Thus, several other embodiments

I claim:

1. In combination with a centrifugal rotor including a separating chamber having a space for collecting sludge separated in the chamber, the rotor also including an indicating channel having a radially outer end remote from the rotor axis and adapted for passage of an indicating liquid through said end, said outer end being positioned to be blocked by sludge collected to a predetermined level in said space, apparatus for detecting said blocking and comprising means for sensing a liquid pressure at a predetermined point in said indicating channel during operation of the rotor, storing means operatively connected to the sensing means for registering a reference pressure condition sensed by the sensing means in a first time period, and comparing means operatively connected to said sensing and storing means for measuring the difference between a said reference pressure condition and an indicating pressure condition sensed by the sensing means in a second period of time commencing after the beginning of said first period, whereby said blocking is indicated when said measured difference acquires a certain value.

2. The combination according to claim 1, in which said reference pressure condition and said indicating pressure condition are the pressures sensed at instants constituting said first and second time periods, respectively.

3. The combination according to claim 1, in which said reference pressure condition and said indicating pressure condition are the pressure changes sensed during time intervals constituting said first and second time periods, respectively.

4. The combination according to claim 1, in which said indicating channel is adapted to form a liquid surface therein during operation of the rotor, said pressure sensing means being operable to sense the position of said liquid surface.

5. The combination according to claim 4, in which said pressure sensing means include a conduit extending from outside the rotor into the indicating channel and opening into said channel at a point radially outside the level of said liquid surface in normal operation of the rotor, the pressure in said conduit corresponding to the radial position of said liquid level.

6. The combination according to claim 1, comprising also means for intermittently passing indicating liquid through said outer end of the indicating channel.

7. The combination according to claim 4, in which said pressure sensing means include a conduit extending from outside the rotor into the indicating channel and opening into said channel at a point radially outside the level of said liquid surface in normal operation of the rotor, the pressure in said conduit corresponding to the radial position of said liquid level, the combination comprising also means for supplying indicating liquid to said channel by way of said conduit.

8. The combination according to claim 1, in which said pressure sensing means include a conduit extending from outside the rotor into the indicating channel and having two branches outside the rotor, said storing means being connected to one of said branches and including a shutoff valve in said one branch, the other branch being connected to said measuring means.

9. The combination according to claim 1, in which said storing means and said measuring means include complementary parts of a differential pressure switch.

10. The combination according to claim 1, in which said pressure sensing means include a conduit extending from outside the rotor into the indicating channel and having two branches outside the rotor, said storing means being connected to one of said branches and including a shutoff valve in said one branch, the other branch being connected to said measuring means, the combination comprising also means for intermittently supplying indicating liquid to said indicating channel, and timing means for closing said shutoff valve and initiating said liquid supply, the timing means being operable to reopen said valve only upon completion of said measuring by the comparing means.

11. The combination according to claim 2, in which said pressure sensing means include a conduit extending from outside the rotor into the indicating channel and having first and second pairs of branches outside the rotor, said storing means including a first device connected to the branches of said first pair for measuring the difference between the pressures therein and also including a shutoff valve in each branch of said first pair, said comparing means including a second device connected to the branches of said second pair for measuring the difference between the pressures therein and also including a shutoff valve in one branch of said second pair, said storing means also including a first part for registering the pressure difference measured by said first device, said comparing means also including a second part coacting with said first part and operable under control of the pressure difference measured by said second device.

12. The combination according to claim 11, comprising also timing means for operating said valves in a predetermined sequence.

13. In the operation of a centrifugal rotor including a separating chamber having a space for collecting sludge separated in the chamber, the rotor also including an indicating channel having a radially outer end remote from the rotor axis and adapted for passage of an indicating liquid through said end, said outer end being positioned to be blocked by sludge collected to a predetermined level in said space, the method comprising the steps of registering a reference pressure condition sensed at a predetermined point in said channel in a first time period, comparing with said reference pressure condition an indicating pressure condition sensed at said point in a second time period commencing after the start of said first period, and repeating said steps until the difference between said compared pressure conditions acquires a predetermined value indicative of said blocking.

14. The method according to claim 13, in which said reference and indicating pressure conditions are the pressures prevailing at said point at instants constituting said first and second time periods, respectively.

15. The method according to claim 13, in which said reference and indicating pressure conditions are changes in the pressures at said point during time intervals constituting said first and second time periods, respectively.